Figure 1:
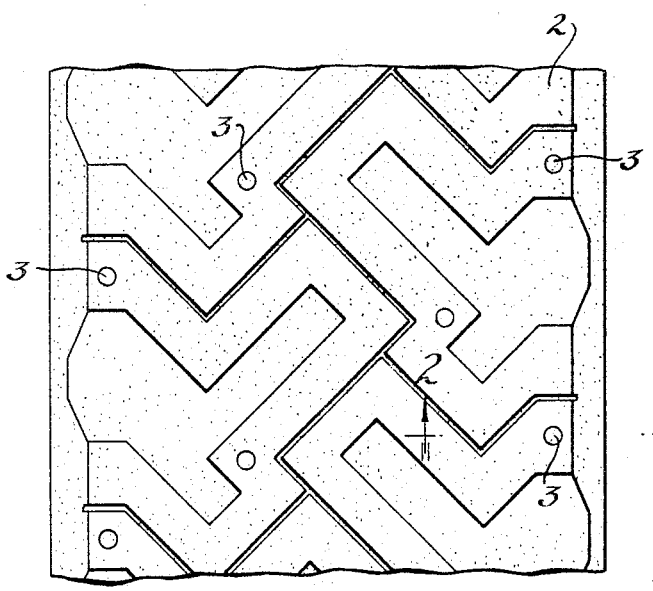

Sept. 13, 1966 C. E. NORDQUIST 3,272,252
SNOW TIRE AND INSERT THEREFOR
Filed Feb. 23, 1965

INVENTOR.
Clarence E. Nordquist
BY
Barnard, McGlynn & Reising
ATTORNEYS

United States Patent Office

3,272,252
Patented Sept. 13, 1966

3,272,252
SNOW TIRE AND INSERT THEREFOR
Clarence E. Nordquist, Lakewood, Colo., assignor to Coors Porcelain Company, Golden, Colo., a corporation of Colorado
Filed Feb. 23, 1965, Ser. No. 434,379
3 Claims. (Cl. 152—211)

This invention relates to tires for automotive vehicles and more particularly to snow tires and hard inserts for the tread thereof to increase traction on slush and packed snow and ice.

It has long been known that tire traction on packed snow or ice can be greatly improved by the use of hard inserts in the tire tread. Numerous prior patents and publications have proposed any number of materials for such inserts; however, at the present state of the art there has been no significant commercial success with such tires. The reasons are numerous. One major problem is that of attaining an insert having sufficient wear characteristics to provide a reasonably long life, this being difficult because even though designed for operation on ice and snow, the fact is that such tires operate for the most part on dry pavement. Another problem is that of adequate insert retention within the tire. The inserts tend to be thrown out of the tire by centrifugal force during operation. Also, at high speed inserts heretofore proposed tend to cause lateral drift of the vehicle from its intended direction of travel. Still another problem is that of excessive road surface damage caused by inserts heretofore proposed.

Basically, then, the situation at present is that whereas it is accepted as proven fact that hard inserts in a tire tread will greatly increase traction on ice and packed snow, there has been no widespread commercial success principally for the reason that to date the tread inserts considered have been wanting in one respect or another.

It is an objective of the present invention to provide an improved hard insert type snow tire which is both durable and reliable and which corrects for those problems which have heretofore been experienced with such tires. Another object of the invention is to provide an improved insert for such snow tires.

Briefly, the present invention is predicated on our discovery that exceptionally good durability, reliability and other desirable snow tire characteristics can be obtained of the inserts for the tread are formed of a sintered high alumina ceramic having a density of at least about 3.9 g./cc. and containing at least about 99% by weight aluminum oxide substantially all in the form of randomly oriented crystals having an average size not exceeding about 10 microns. Such inserts have outstandingly good wear characteristics, have no tendency to cause lateral vehicle drift even at high speeds, and do little if any damage to the road surface as compared with previous types of inserts. Further, such high alumina ceramic inserts are securely retained by the tire tread with very little if any loss thereof due to centrifugal force or otherwise during operation. Still further, it has been found that such inserts instead of wearing unevenly, as is characteristic of previously proposed inserts, wear quite evenly and at a rate substantially the same as that of the rubber of the tire tread. While we cannot state with certainty the precise reasons for such greatly improved performance, we theorize, and investigation thus far appears to indicate, that one major contributing factor is the high heat capacity of such ceramic. That is, inserts made in accordance with the invention undergo relatively little temperature increase during tire operation even on dry pavement with the result that there is no deterioration of the rubber which abuts the inserts. The absence of such rubber deterioration may account in large measure for the excellent retention of the inserts by the tread. Also, it appears to account for the even wear rate, this because the adjacent rubber not becoming tacky due to deterioration, the inserts are left free to rotate and apparently do rotate during tire operation whereby uniform insert wear rate results. But whatever the theory, the fact is that snow tires having such high alumina ceramic inserts provide greatly improved performance, durability and reliability and at lesser cost than for inserts which have heretofore been used.

Figure 2:
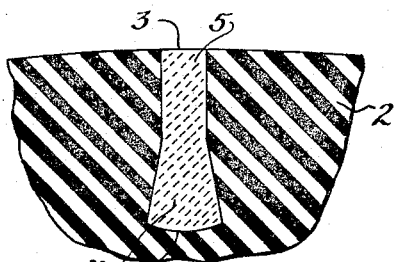
Figure 3:
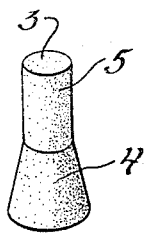

Other objects, features and advantages of the invention will appear more fully from the following detailed description of a preferred embodiment thereof made with reference to the drawings in which:

FIGURE 1 is an elevational view of a portion of a snow tire made in accordance with the invention; and FIGURE 2 is a sectional view in enlarged scale taken on the line 2—2 of FIGURE 1; and FIGURE 3 is a perspective view of a snow tire insert formed in accordance with the invention.

Referring now to FIGURE 1 there is shown a snow tire 2 which is conventional in all respects except that it has inserts 3 retained within radially extending openings in the tread thereof. The inserts are of course spaced from each other around the circumference of the tire; usually about 60–150 inserts per tire are sufficient. In the embodiment shown each insert is in the form of a stud having an enlarged truncated conical head portion 4 embedded within the tire and a radially outwardly extending cylindrical shank portion 5, the outer surface of which is exposed at the tire tread as shown. It is desirable but not essential to shape the head portion with an arcuate end surface 6. Each stud is, of course snugly received within its opening in the tire tread, the rubber surounding the stud being slightly compressed to assist in retaining the stud during tire operation. The truncated conical head shape, as shown, is preferred though it will be understood that other shapes such a cylindrical head can be used if desired.

In accordance with the invention, the studs are shaped sintered high alumina ceramic bodies having a density of at least 3.9 and containing about 99% or more by weight of aluminum oxide substantially all of which is in the form of crystals randomly oriented and of an average size not exceeding approximately ten microns in their largest dimension. Such inserts are exceptionally hard and tough and hence have an extremely low wear rate—substantially the same as that of the rubber tread. Further, and as alluded to above, the wear at the exposed end of the shank is substantially even around the circumferential edge thereof—this as distinguished from the uneven wear of other inserts which results in a slanted exposed surface after a period of operation. It is normally expected that such uneven wear will occur since it will be manifest that as the tire rotates and as each insert comes into contact with the road there is a tendency for the insert to be turned such that its longitudinal axis is at an angle to its normal radially extending position, the inherent resiliency of the tire tread enabling the insert to take such canted position. This phenomena undoubtedly occurs with the inserts of the present invention however the fact is that they wear substantially evenly. The logical explanation is that the high alumina insert of this invention, as distinguished from previous inserts, more freely rotates about its longitudinal axis during the tire operation and hence even though it cants upon contact with the road there is relatively even wear over a reasonable period of tire operation. By reason of its high density and small crystal structure, the ceramic has a smooth surface but not so much smoother than previously proposed inserts as to account for the different results. We have theorized that the difference in results stems from the fact that whereas previous inserts become heated to relatively high temperatures during operation on dry pavement, the inserts of the present invention remain at a relatively low temperature due to the inherent thermal characteristics of the high density small crystal structure ceramic. That is, the ceramic has low thermal conductivity and very high heat capacity. Hence, even though considerable heat is generated due to friction, there is relatively little temperature increase in the ceramic. Because of the lower temperature, there is no deterioration of the rubber abutting the insert due to excessive heat and hence the rubber remains firm and non-tacky. This enables the insert to rotate slightly about its longitudinal axis from time to time during tire operation thereby providing the desirable wear characteristics. Also, since there is substantially no deterioration of the rubber adjacent the insert, the insert is retained firmly within the tire tread for the entire life of the tire. As alluded to above, it has additionally been found that the inserts do relatively little damage to the road surface and have no tendency to cause high speed vehicle drift.

Ceramic inserts of the desired composition and structure can be manufactured at low cost as follows: a raw ceramic batch of aluminum oxide (preferably 99.7% pure aluminum oxide of which 90% or more is of the alpha type) is milled until the average particle size of the raw batch has been reduced to about 3 microns and finer. Such raw batch is then pressed in suitable dies or molds to form green compacts of the shape desired for the tire inserts, the pressing being such that the compacts have a green density of about 2.0 g./cc. or greater. Pressures on the order of 5000 p.s.i. or higher are generally required to attain such density. The compacts should of course be of a size larger than that desired for the finished inserts since there is shrinkage during the subsequent firing operation.

The green compacts so formed are then fired to cause sintering of the ceramic. A firing temperature of about 1450 to 1550 degrees C. for approximately four hours is satisfactory though higher temperatures, for example 1625° C., and a lesser firing time of about 1 to 2 hours can be used if desired. The resulting sintered ceramic inserts will have a density upwards of 3.9 g./cc. and the aluminum oxide will be in the form of randomly oriented crystals having an average size not in excess of about 10 microns. Numerous variations can be used. For example, the inserts can be made of say 99% aluminum oxide and the remainder other oxides such as magnesium oxide, titanium oxide, chromium oxide, nickel oxide, vanadium oxide or the rare earth oxides. Such additive oxides are ofter desirable for inhibiting crystal growth of the aluminum oxide during firing thereby assisting in maintaining the average alumina crystal size at below 10 microns. Higher firing temperatures can be used though generally to no advantage.

I am cognizant that it has previously been proposed to use stone and other ceramic-like materials for snow tire inserts; however, I have found that such inserts are grossly deficient and the key to success is to use inserts of alumina ceramic as described.

Having now described my invention in ample detail to enable those skilled in the art to practice same and with the understanding that various changes and modifications may be made all within the full and intended spirit and scope of the invention as set forth in the following claims.

I claim:

1. A tire for automative vehicles having a rubber tread with spaced inserts therein and exposed at the surface thereof, said inserts being shaped sintered ceramic bodies having a density of at least about 3.9 g./cc. and containing at least about 99% by weight aluminum oxide substantially all of which is in the form of randomly oriented crystals having an average size not exceeding about 10 microns.

2. A tire having a rubber tread with generally radially extending elongated spaced inserts therein, each of said inserts having an enlarged head portion embedded in said tread and a shank portion extending generally radially outwardly of said head portion with an end surface exposed at the surface of said tread, said inserts being formed of a sintered ceramic having a density of at least about 3.9 g./cc. and containing at least about 99% by weight aluminum oxide substantially all of which is in the form of randomly oriented crystals having an average size not exceeding about 10 microns.

3. A ceramic insert for automotive vehicle snow tires comprising a sintered ceramic body having an enlarged head portion and a shank portion extending therefrom, said body having a density of at least about 3.9 g./cc. and containing at least about 99% by weight aluminum oxide substantially all of which is in the form of randomly oriented crystals having an average crystal size not exceeding about 10 microns.

References Cited by the Examiner

UNITED STATES PATENTS

| | | | |
|---|---|---|---|
| 1,189,223 | 7/1916 | Albrecht | 152—211 X |
| 1,330,973 | 2/1920 | Bartholomew | 152—211 X |
| 1,330,988 | 2/1920 | Sayre | 152—211 X |
| 1,435,566 | 11/1922 | Vanderley et al. | 152—211 X |

ARTHUR L. LA POINT, *Primary Examiner.*

C. W. HAEFELE, *Assistant Examiner.*